(12) United States Patent
Hill et al.

(10) Patent No.: US 8,106,888 B2
(45) Date of Patent: Jan. 31, 2012

(54) VIBRATION SENSING TOUCH INPUT DEVICE

(75) Inventors: Nicholas P. R. Hill, Cottenham (GB); Darius M. Sullivan, Cherry Hinton (GB)

(73) Assignee: 3M Innovative Properties Company, Saint Paul, MN (US)

( * ) Notice: Subject to any disclaimer, the term of this patent is extended or adjusted under 35 U.S.C. 154(b) by 1614 days.

(21) Appl. No.: 10/957,364

(22) Filed: Oct. 1, 2004

(65) Prior Publication Data

US 2006/0071912 A1    Apr. 6, 2006

(51) Int. Cl.
*G09G 5/00* (2006.01)
(52) U.S. Cl. .......................................... 345/173
(58) Field of Classification Search ............ 345/173–177
See application file for complete search history.

(56) References Cited

U.S. PATENT DOCUMENTS

| | | | |
|---|---|---|---|
| 5,517,579 A | 5/1996 | Baron et al. | |
| 5,591,945 A * | 1/1997 | Kent ........................... | 178/18.04 |
| 5,637,829 A | 6/1997 | Nakamura et al. | |
| 5,717,432 A | 2/1998 | Miwa et al. | |
| 6,118,435 A | 9/2000 | Fujita et al. | |
| 6,262,717 B1 | 7/2001 | Donohue et al. | |
| 6,504,530 B1 | 1/2003 | Wilson et al. | |
| 2002/0008692 A1* | 1/2002 | Omura et al. ................. | 345/173 |
| 2002/0135570 A1* | 9/2002 | Iisaka et al. ................... | 345/177 |
| 2002/0144886 A1 | 10/2002 | Engelmann et al. | |
| 2003/0066692 A1 | 4/2003 | Devige et al. | |
| 2003/0217873 A1 | 11/2003 | Paradiso et al. | |
| 2004/0133366 A1 | 7/2004 | Sullivan et al. | |
| 2004/0160421 A1 | 8/2004 | Sullivan | |
| 2004/0233174 A1 | 11/2004 | Robrecht et al. | |

FOREIGN PATENT DOCUMENTS

| | | |
|---|---|---|
| CN | 1441336 A | 9/2003 |
| EP | 0474232 | 11/1992 |
| EP | 0561339 | 9/1993 |
| EP | 1 240 617 | 2/2004 |
| JP | 58-182746 | 10/1983 |
| JP | 10-293644 | 11/1998 |
| WO | WO 01/48684 | 7/2001 |
| WO | WO 02/084244 | 10/2002 |
| WO | WO 02-084578 | 10/2002 |
| WO | WO 03/005292 | 1/2003 |

(Continued)

OTHER PUBLICATIONS

U.S. Appl. No. 10/739,471; Piezoelectric Transducer; Nicholas P.R. Hill; Filed Dec. 18, 2003; 20 pgs.

(Continued)

*Primary Examiner* — Seokyun Moon
(74) *Attorney, Agent, or Firm* — Steven A. Bern (57) ABSTRACT

The present invention provides a touch sensitive input device that uses vibrations due to touch impacts and/or frictional movement of a touch implement across a surface to determine information related to the touch, such as touch position. The present invention also provides for detecting lift-off events in such vibration sensing input devices. Lift-off detection can be accomplished by monitoring for a signal that indicates a sustained touch on the touch plate, and correlating a change in such a signal with a lift-off event. Signals indicating a sustained touch can include low frequency rumbles coupled into the touch plate via the touch implement, touch plate bending under the force of a sustained touch, and touch plate displacement under the force of a sustained touch.

26 Claims, 3 Drawing Sheets

FOREIGN PATENT DOCUMENTS

WO    WO 2005/066756      7/2005

OTHER PUBLICATIONS

U.S. Appl. No. 10/750,502; Touch Sensitive Device Employing Bending Wave Vibration Sensing and Excitation Transducers; Nicholas P.R. Hill and Darius M. Sullivan; Filed Dec. 31, 2003; 41 pgs.

U.S. Appl. No. 10/750,290; Touch Sensitive Device Employing Impulse Reconstruction; Nicholas P.R. Hill and Darius M. Sullivan; Filed Dec. 31, 2003; 35 pgs.

U.S. Appl. No. 10/750,291; Touch Sensing With Touch Down and Lift Off Sensitivity; Nicholas P.R. Hill and Darius M. Sullivan; Filed Dec. 31, 2003; 47 pgs.

\* cited by examiner

VIBRATION SENSING TOUCH INPUT DEVICE

The present invention relates to touch input devices that utilize vibrations propagating in a touch plate to determine information relating to the touch input.

BACKGROUND

Electronic displays are widely used in all aspects of life. Although in the past the use of electronic displays has been primarily limited to computing applications such as desktop computers and notebook computers, as processing power has become more readily available, such capability has been integrated into a wide variety of applications. For example, it is now common to see electronic displays in a wide variety of applications such as teller machines, gaming machines, automotive navigation systems, restaurant management systems, grocery store checkout lines, gas pumps, information kiosks, and hand-held data organizers to name a few. For user interactions with such displays and devices, it is often found useful and convenient to provide a touch sensitive input device.

SUMMARY

The present invention provides a method for detecting the presence of a sustained touch on a vibration-sensing touch sensor. The method includes determining the position of a touch to a touch surface of a touch plate using vibrations propagating in the touch plate due to the touch, detecting a signal indicative of sustained contact of the touch on the touch surface, and correlating a sufficient change in the signal indicative of the sustained contact with a removal of the touch from the touch surface. In various embodiments, the signal indicative of the sustained contact can include displacement of the touch plate, flexing of the touch plate, low frequency vibrations coupled in to the touch plate from the touch contact, and the like.

The present invention also provides a touch input device capable of determining touch input information from signals generated in response to vibrations propagating in a touch plate due to the touch input on a touch surface of the touch plate, where the input device includes one or more sensors coupled to the touch plate and configured to generate signals while the touch input remains on the touch surface and electronics configured to receive signals generated by the one or more sensors for determining whether the touch input has been removed from the touch surface. In some embodiments, the sensors used to detect the sustained touch input can also be used for detecting the vibrations used to determine the touch position. In other embodiments, different sensors can be used to detect the sustained touch input and the vibrations used to determine the touch position.

BRIEF DESCRIPTION OF THE DRAWING

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates to vibration-sensing touch sensors where the touch contact location can be determined from the signals generated by vibrations caused by the impact or frictional movement of a finger, stylus, or other touch implement on a touch surface of a touch plate.

In addition to detecting touch-down and tracing of a touch contact, it may also be beneficial to determine contact lift-off, indicating when the touch has been removed from the surface. According to the present invention, lift-off detection can be accomplished by monitoring a signal that indicates sustained contact of the touch on the touch surface, and then detecting a change in that signal, such as a drop off in signal level, that can be correlated with a removal of the sustained touch. For example, a touch force on the touch plate that exists while the touch contact remains can produce signals indicative of a sustained touch. Touch force can be measured using any number of techniques including those that measure displacement of the touch plate under a touch force and those that measure bending or flexing of the touch plate under a touch force. Sustained touches can also result in coupling relatively low frequency vibrations into the touch plate. Vibration sensors can be used to monitor such low frequency vibrations, or rumble, the presence of which indicates a sustained touch and the subsequent absence of which indicates a lift-off event. In some embodiments, the same vibration sensors used to detect vibrations from the touch impact or frictional movement of the touch can also be used for detecting the rumble, while in other embodiments one or more separate sensors can be used to detect the rumble.

In systems that use touch input, it can be useful to know when lift-off has occurred. For example, a displayed icon associated with a function may be highlighted when the touch implement is located directly over the icon and the associated function executed upon lift-off. In drag and drop operations, it may be desirable to perform the drop function only when a lift-off is detected. In many applications, lift-off can be deemed as a deliberate user action on which to base the performance of a function.

Lift-off detection can be difficult in touch systems that rely on vibrational signals caused by touch impacts or frictional movement since the removal of a contact may not reliably result in detectable variations. Such passive vibration sensing systems can be contrasted with active vibration sensing systems that use transducers to propagate vibrations or ultrasonic waves that interact with the touch implement in a way that can be detected. In such systems, so long as the touch is sustained, it can be directly measured, and so it is straightforward to detect lift-off events.

The operation of exemplary passive vibration sensing touch sensors is described in International Publications WO 01/48684 and WO 03/005292, European Patent EP 1 240 617

B1, commonly assigned U.S. patent application U.S. Ser. No. 10/729,540, U.S. Ser. No. 10/750,290, U.S. Ser. No. 10/750,291 and U.S. Ser. No. 10/750,502, U.S. Patent Publications U.S. 2003/0066692 and U.S. 2002/135570, and U.S. Pat. No. 5,637,829, all of which are wholly incorporated into this document. Briefly, a passive vibration sensing touch input device can function as follows. Vibration sensors such as piezoelectric transducers are coupled to the touch plate in such a way that the sensors can detect bending wave vibrations in the touch plate over a frequency range that at least encompasses vibration frequencies likely to be caused by the impact of a touch input on the touch surface of the touch plate. The vibration sensors pick up the vibrations generated by a touch-down event and generate signals that are transmitted to controller electronics. The action of touching the input surface of the plate generates an impulse of energy whose bandwidth and amplitude depend on the contact material (finger, stylus, glove, etc.), the plate material (glass, acrylic, etc.), and the strength of contact. The energy imparted at the contact point propagates towards the vibration sensors, generally located at various points around the periphery of the touch plate (such as at the corners of a rectangular plate), which generate a signal that can be digitized. The controller electronics can run calculations on the digitized signal to determine the location of the touch impact, or other information related to the touch such as the strength of the touch, the type of touch implement, and so forth.

Passive vibration-sensing touch devices can also detect vibrations generated by a touch implement being traced across the input surface of the touch plate. Frictional contact between the touch implement and surface of the panel can generate a noise-like signal whose bandwidth and amplitude depends on the materials of the touch implement and the touch plate, the roughness of the touch surface and whether that roughness is periodic or random, and the speed and pressure of the tracing, among other things. The energy input at the contact point propagates to the vibration sensors and the location is calculated in much the same way as for the initial impact of the touch.

Because vibrations indicative of a touch input generally include bending wave vibrations that are susceptible to dispersion during propagation, it may be desirable to correct for dispersion effects that may otherwise give rise to errors in the input position or other determined information. Exemplary methods for correcting for dispersion effects are disclosed in previously identified document WO 01/48684.

The principle that underlies the detection of touch impacts and frictional touch movements is that changes in the contact state result in vibrations that can be sensed by the touch sensor. This has a corresponding advantage that other objects in static contact with the screen have minimal effect on the performance. Features such as palm rejection and resistance to contaminants take advantage of this property. For example, a person can rest his or her hand on the touch sensor surface and tap the surface with a finger, and the finger tap location can be determined despite the presence of the hand contact.

Passive vibration detection methods can have difficulty in detecting a lift-off event using the same techniques employed for impact or frictional movement detection. Under many circumstances, the removal of a touch contact does not impart the same magnitude of vibrational energy that results from an initial touch impact or frictional movement of a touch implement. As such, lift-off signals may not be detectable, and a method of lift-off detection based on such a reverse impulse may not be sufficiently reliable to be incorporated in the system operation alone.

One method that may be employed to detect lift-off is based on the low frequency signals coupled into the touch plate from a touch implement being in contact with the touch surface. This method relies on the observation that, in addition to the energy input on first contact, there is generally a low frequency noise-like input that can be detected while the user maintains contact with the touch surface. This noise input from a sustained touch is generally in the frequency range of 0 Hz to 200 Hz, with signal level that generally falls off as the frequency increases. Lift-off may be registered by monitoring the signal generated from a sustained touch and detecting a change in such signals, such as a drop-off or absence of the signal.

In some embodiments, the 0 Hz signal, which is directly related to the static force input by the contact, can be monitored. Generally, the vibration sensors used to detect bending wave vibrations in the touch plate due to a touch impact or frictional movement of the touch implement are better suited for AC measurements rather than DC measurements that are needed to detect static forces. For example, piezoelectric sensors suitable for vibration sensing are capacitive devices that generate a charge in response to a stress. An integrator device can then be used to convert this charge to a voltage for measurement, which cannot be DC-coupled and still retain sufficient stability. As such, sensors such as capacitive force sensors, strain gauges, flex sensors, and piezoresistive sensors may be suitably used to detect 0 Hz sustained touch signals such as plate displacement and/or plate flexing.

In other embodiments, the low frequency (above 0 Hz) noise-like signal can be detected using vibration transducers coupled to the touch plate. These vibration transducers can be the same sensors used for touch location or can be one or more separate sensors used to monitor the sustained touch signal. Preferably, the sensors used to monitor the low frequency vibrations indicative of a sustained touch are sensitive to vibrations at least in 5 Hz to 200 Hz range. As such, the low frequency bandwidth of the sensors and driving electronics should be sufficient to sense signals at least in that region. In operation, an increase in the level of low frequency energy sensed by the controller is registered upon contact, and remains at an increased level while the touch in maintained. When a lift-off event occurs, the low frequency energy returns to a lower level.

The low frequency signals may be used as a reliable measure of lift-off, however due to the bandwidth of these signals, the speed of response may be slower than desired. The slow response time comes from having to measure a few cycles at the low frequency of interest to detect changes, and the wavelength of the lower frequency cycles can be on the order of the size of the touch plate. In this situation, the low frequency lift-off measurement may be used to best effect in combination with another lift-off detection technique, including the reverse impulse. The reverse impulse is the relatively small amplitude disturbance caused by lifting a touch input off the touch surface, which can result in relatively small amplitude vibrations that may or may not be detectable in a given instance. In cases where a reverse impulse can be reliably registered, as may often be the case with a natural finger movement, then lift-off may be reported with a fast response time. In situations where a reverse impulse is not registered or cannot be reliably registered, as can be the case for stylus movements and some gentle finger movements, then lift-off may still be reported reliably by detecting a drop-off in low frequency rumble, though this may be at the cost of a slower response speed. That being said, it is generally less important for the lift-off response to be as fast as the initial touch location determination. Generally, a user expects to see a response in the display shortly after touching down, for example within about 5 to 25 microseconds. Once the correct touch position is confirmed by the user, the user is likely to tolerate a longer response time for the performance of a function that is triggered by the lift-off. In fact, the user is likely to perceive that the longer response time for detecting a lift-off is part of the processing time to launch the selected function.

In order to sense the low frequency signals for passive lift-off, it may be beneficial to optimize the sensitivity of the vibration sensors in the low frequency range. One possible technique for this is to make use of the sensitivity of the piezoelectric transducers along an axis perpendicular to the touch plate (z-axis sensitivity). In one embodiment, the piezoelectric transducers can be set up to sense the in-plane stress on a surface of the touch plate in response to the passage of a bending wave. In addition to this mode, the sensors can generate a voltage when compressed in the z-axis (normal to the touch plate surface). The low frequency sensitivity of the sensors may be enhanced by placing foam between the outer surface of the touch plate and the supporting bezel. The output level of the sensor usually increases with the stiffness of the foam placed under the touch plate.

An alternative is to optimize the edge suspension foam to act as a pivot at these low frequencies, translating the low frequency vibration from a z-axis force to into in-plane stress. In-plane stress can be sensed by the piezoelectric sensor using its normal mode of operation.

One potential consequence of increasing the sensitivity of the system to low frequencies may be reduced dynamic range. The dynamic range of the system refers to the range of signals that are generally input by natural use with a variety of contact types (stylus, finger, etc.) and a range of strengths of touch. The largest signals result from a strong touch with a stylus or other hard object at a location close to one of the sensors. The smallest signals generally result from a light finger touch far from one of the vibration sensors. Maximizing the low frequency sensitivity may significantly increase the level of signal registered by the sensors and controller, whereas the magnitude of the high frequency signal used for touch location is not changed. The system therefore benefits from greater dynamic range when sensing the same range and variety of touch inputs.

One possible solution to the reduced dynamic range is to separate the high and low frequency signals and sense them with difference channels of the analog to digital converter (ADC). The low frequency signals may be summed together and passed to one ADC channel of slow speed (and therefore low cost). The signals are also high pass filtered and passed into four separate ADC channels for contact location.

The description above focuses on the sensing of a low frequency vibration level and its change in the presence of a contact. In addition to sensing the level of low frequency vibrations, it may be beneficial to measure the relative phase of the signals at each sensor. Such a measure may be implemented by analyzing the frequency response, or alternatively calculating a cross-correlation or coherence function. A method based on the relative phase may be beneficial when there is a large amount of low frequency noise. Here the action of the contact is to disturb the waves already present in the panel due to background vibration, which in turn will affect the relative magnitude and phase of the pickup signal at each sensor.

A similar method is to set up an adaptive filter that cancels the pickup signal of low frequency noise. This may either be based on an external reference, such as an accelerometer or microphone positioned to measure external noise or vibrations, or can be implemented in a pair-like fashion where one sensor signal is taken as the reference with which to cancel the signal from another sensor. When a contact is present, the system transfer function reduces the effectiveness of the cancellation filter. The cancellation signal may then be used as an indicator of lift-off.

Figure 1:
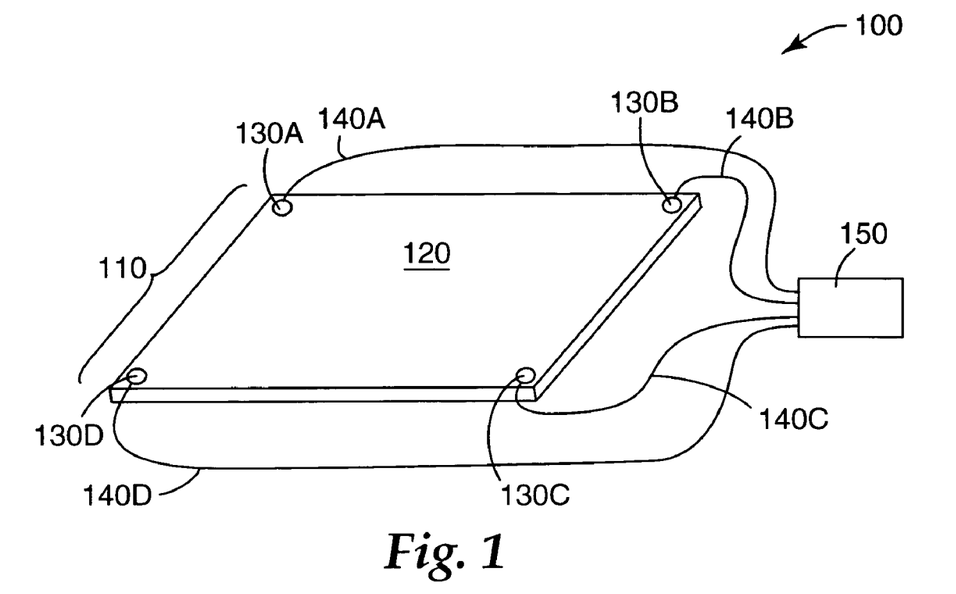
FIG. 1 schematically illustrates a vibration sensing touch input device useful in the present invention.

The present invention can be implemented using a vibration sensing touch input device 100 schematically shown in FIG. 1. Vibration sensing touch input device 100 includes a touch sensor 110 having vibration sensors 130A-130D coupled to a touch plate 120, and controller electronics 150 adapted to receive signals from the vibration sensors through signal lines 140A-140D. Vibrations sensors 130A-130D are adapted to detect vibrations propagating in the touch plate due to a contact or frictional movement of a touch implement on the touch plate. The sensed vibrations are converted into signals that can be used by the controller to determine the position of the touch input, for example as described in WO 01/48684.

For illustrative purposes, FIG. 1 shows four vibration sensors, one in each corner of a rectangular touch plate, although fewer or more vibration sensors can be used and can be placed in different arrangements. When the touch plate is intended for use over a display so that the display is viewable through the touch plate, placement of the vibration sensors out of the field of view may be desired, for example near the corners or edges of the touch plate. Because the detected vibrations generally include bulk vibrations (not confined to the touch plate surface), the vibration sensors can be mounted either on the top (touch) surface of the touch plate, or on the rear surface of the touch plate.

The vibration sensors can be any sensors capable of detecting vibrations propagating in the touch plate. Piezoelectric materials may provide exemplary vibrations sensors. The vibration sensors 130A-130D can be bonded to touch plate 120 by any suitable means, for example using an adhesive, solder, or other suitable material, so long as the mechanical coupling achieved is sufficient for vibrations propagating in the touch plate can be detected by the vibration sensors. Exemplary vibration sensors and vibration sensor arrangement are disclosed in co-assigned U.S. patent applications U.S. Ser. No. 10/440,650 and U.S. Ser. No. 10/739,471, which are fully incorporated into this document.

The touch plate 120 can be any material capable of supporting the vibrations to be sensed. Preferably, touch plate 120 is a rigid plate, and can be any suitable material such as glass, plastic (polyacrylate, polycarbonate, etc.), wood, cardboard, metal, or the like. The touch plate can be transmissive of visible light or not depending on the application. At least some degree of transmission of visible light is desirable when a displayed image is meant to be viewed through the touch sensor. The touch plate can also incorporate static graphics (permanent or removable, laminated or otherwise attached, or held in close proximity, and positioned either above or below the touch plate), whether or not the touch sensor is used in conjunction with a display viewable through the touch plate. The touch plate can also be configured to have an image projected onto it. The touch plate can also incorporate a roughened front surface that can assist in creating detectable vibrations as a user drags a finger or other touch implement across the surface.

Vibration sensing input devices can also include vibration damping material (not indicated in FIG. 1) to help acoustically isolate the touch plate from its surroundings. For example, it may be desirable to mount the touch plate in a system so that the touch plate is substantially isolated from external vibrations and/or so that vibrations propagating in the touch plate are absorbed at the edges to reduce reflections. Exemplary acoustic barrier materials may include various foam tapes such as acrylic foam tapes, double-sided adhesive tapes such as those sold by 3M Company under the trade designations 3M 4956 and 3M 5962, urethane foam tapes, single-coated tapes such as those sold by 3M Company under the trade designation 3M 4314, and the like. Other materials that may be suitable include various urethanes and silicones, as well as viscoelastic materials useful for vibration damping applications.

In addition to sensing vibrations due to touch implement contact and frictional movement on the touch plate, one or more of the vibration sensors 130A-130D of vibration sensing touch input device 100 can be used to detect signals indicative of a sustained touch in some embodiments of the present invention. For example, one or more of vibration sensors 130A-130D can be used to monitor for low-frequency rumble coupled into the touch plate during a sustained touch. In this case, it may be desirable to employ at least one vibration sensor that is sensitive to frequencies less than about 200 Hz. As another example, one or more of vibration sensors 130A-130D can be used to monitor for bending of the touch plate under the influence of a sustained touch. In this case, it may be desirable to employ at least one vibration sensor that is long enough and oriented in such a direction as to be sensitive to surface stresses caused by static plate bending.

Figures 2A, 2B:
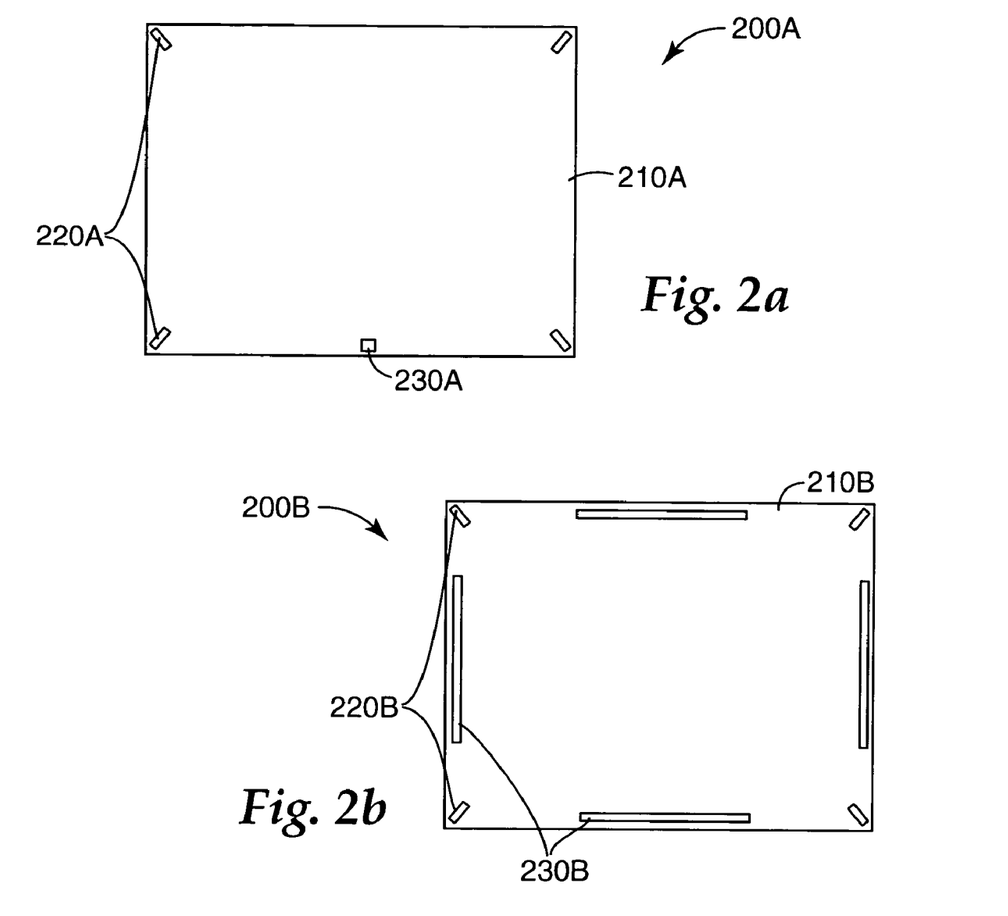
FIGS. 2(a), 2(b) and 2(c) schematically illustrate some embodiments of touch sensors according to the present invention.
Figure 2C:
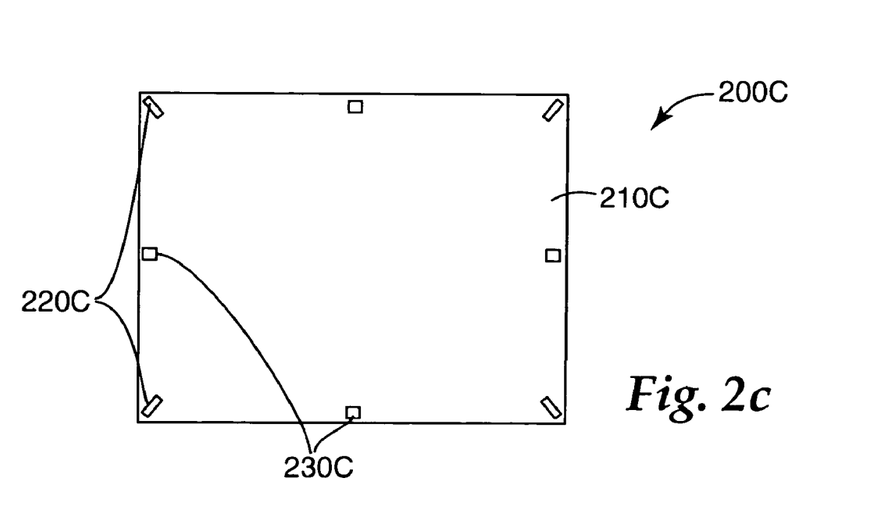

In some embodiments, one or more sensors may be used for the purpose of detecting sustained touches in addition to the vibration sensors used for touch position detection. FIGS. 2(a)-(c) schematically show some non-limiting examples.

In FIG. 2(a), vibration sensing input device 200A includes a touch plate 210A, vibration sensors 220A located in the corners of the touch plate for detecting vibrations due to touch contacts and/or frictional movement, and a low-frequency rumble detector 230A located along one of the sides of the touch plate. Rumble detector 230A can be any vibration-sensitive device, preferably particularly sensitive to low frequency vibrations. The rumble detector can be located in any suitable location on the touch plate. Additional rumble detectors can also be used.

In FIG. 2(b), vibration sensing input device 200B includes a touch plate 210B, vibration sensors 220B located in the corners of the touch plate for detecting vibrations due to touch contacts and/or frictional movement, and plate bending sensors 230B located along each of the edges of the touch plate. Plate bending sensors 230B can be adapted for detecting static plate bending that occurs under the influence of a sustained touch. Plate bending sensors 230B can be any suitable devices such as strain gauges or elongate piezoelectric transducers that are sensitive to relatively long wavelengths. Although FIG. 2(b) shows four plate bending sensors, it is understood that fewer or more sensors can be used, and can be arranged and oriented in any suitable manner. Using multiple plate bending sensors as shown may allow increased sensitivity to plate bending due to sustained touches for more touch positions across the touch plate. Preferably, touch plate 210B has such a thickness, and is mounted so that typical sustained touch forces result in plate bending sufficient for detection by sensors 230B.

Figure 3:
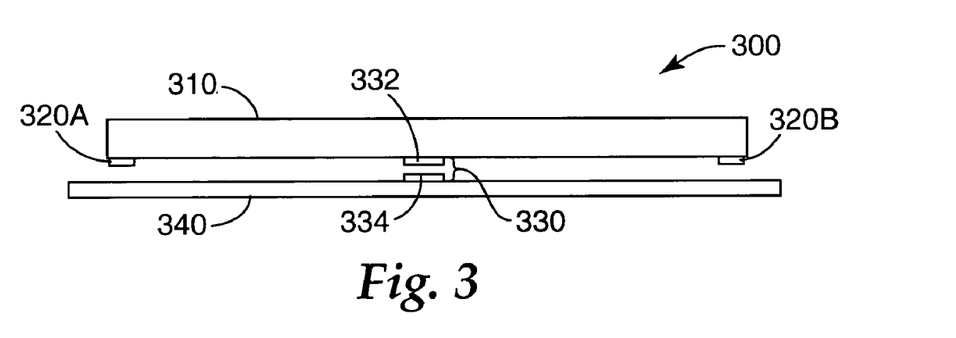
FIG. 3 schematically illustrates a touch sensor according to the present invention that incorporates a displacement sensor.

In FIG. 2(c), vibration sensing input device 200C includes a touch plate 210C, vibration sensors 220C located in the corners of the touch plate for detecting vibrations due to touch contacts and/or frictional movement, and plate displacement sensors 230C located along each of the edges of the touch plate. Plate displacement sensors 230C can be adapted to detect displacements of the touch plate 210C under the force applied by a sustained touch. An example of a suitable displacement sensor is shown in FIG. 3. Although FIG. 2(c) shows four plate displacement sensors, it is understood that fewer or more displacement sensors can be used, and can be arranged in any suitable manner. Using multiple plate displacement sensors as shown may allow increased sensitivity to sustained touch forces for more touch positions across the touch plate. Preferably, touch plate 210C is mounted so that typical sustained touch forces result in plate displacements that can be detected.

FIG. 3 shows a schematic side view of a portion of an input device 300 that includes a touch plate 310, vibration sensors 320A and 320B, and a plate displacement sensor 330. Displacement sensor 330 includes an upper conductive plate 332 mounted to the bottom surface of the touch plate 310, which is moveable under a touch force, and a lower conductive plate 334 mounted to a support surface 340 whose position is fixed relative to the touch plate. Conductive plates 332 and 334 may be plates of a variable capacitor whose capacitance can be monitored and correlated to displacements of the touch plate. Exemplary displacement sensors for measuring touch forces include variable capacitor force sensors such as those disclosed in International Publications WO 02/084244 and WO 02/084578, each of which is wholly incorporated into this document. While such force sensors can be used to determine touch position, they can also be useful in the present invention to determine the presence, and subsequent absence, of a sustained touch.

Figure 4:
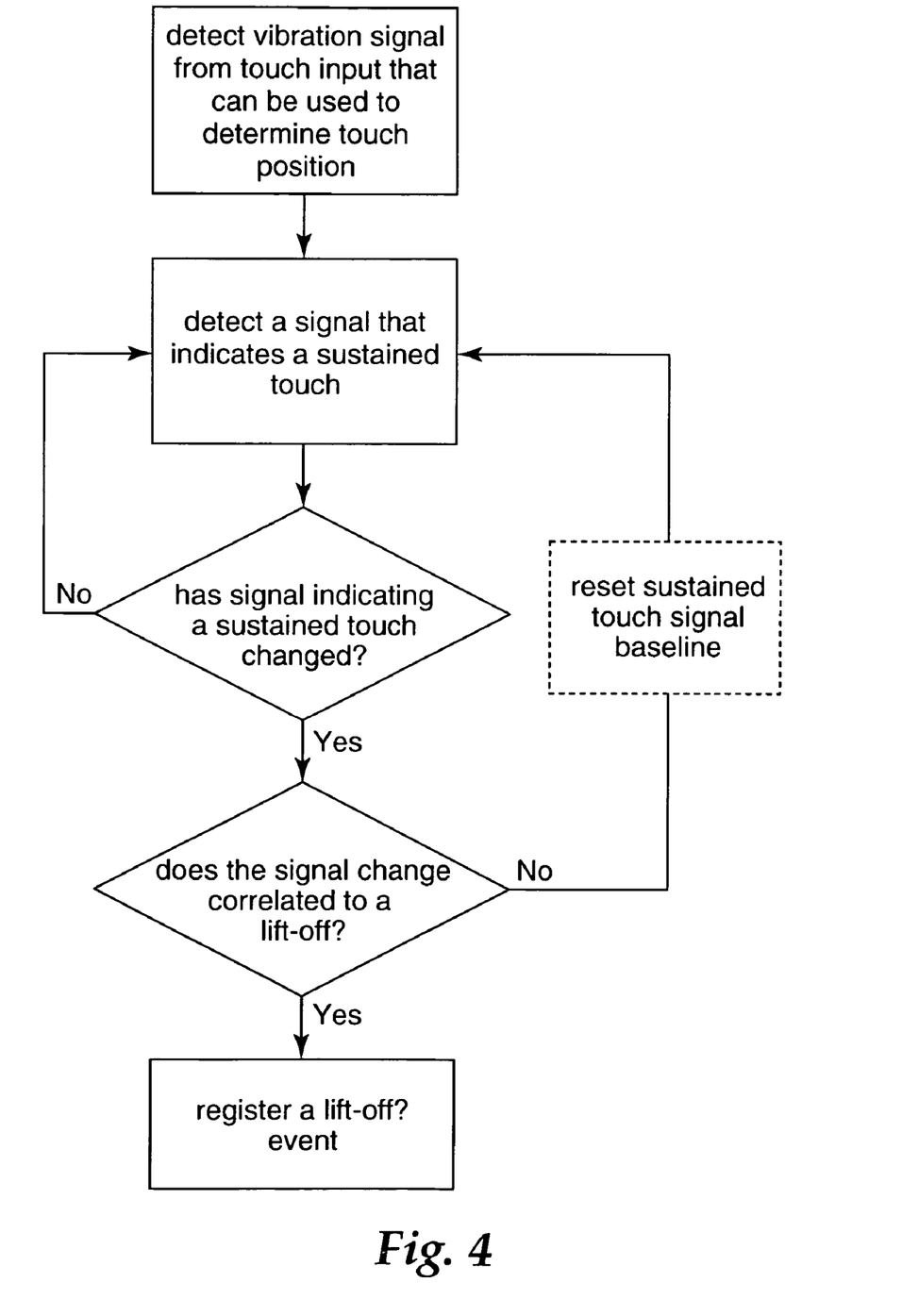
FIG. 4 is a flow chart illustrating steps that may be performed in methods of the present invention.

FIG. 4 is a flow chart depicting steps that can be taken according to the present invention to detect lift-off of touches in passive vibration sensing touch input devices. Generally, a touch is first detected by detecting vibrations that can be used by the controller to determine the touch position. Once a touch event has been verified, the system can detect a signal indicating a sustained touch. In the occasion of a short duration touch impact without a sustained touch (for example, a tap and lift-off without a hold), the absence of sustained touch signals can be used to correctly interpret that no sustained touch was held. Once signals indicating a sustained touch have been detected, the system may optionally monitor for changes in the sustained touch signal that do not necessarily indicate lift-off, but are nonetheless useful to monitor so that the sustained touch signal can be continuously or periodically updated. In this way, the threshold for determining the absence of the sustained touch signal can also be updated. For example, as the sustained touch signal is sampled, each new sample can be compared in magnitude to the last, and when the new signal falls below a certain amount as compared to the last signal (e.g., 10% or less of the previously detected signal), the drop off in signal may be correlated to a lift-off. Once the signal change has been deemed to correlated to a lift-off event, the lift-off can be registered.

Figure 5:
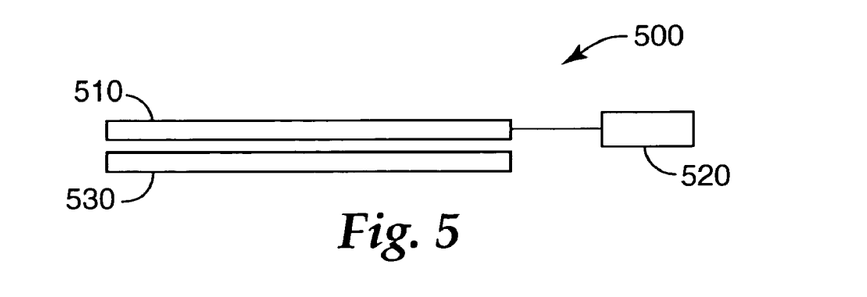
FIG. 5 schematically illustrates a display system that includes a vibration sensing touch input device of the present invention.

FIG. 5 schematically shows a vibration sensing input device integrated into a system 500 that includes a sensor portion 510, controller electronics 520, and a display 530. The sensor portion 510 includes the touch plate, vibration sensors (not shown) and sustained touch sensors (not shown). The vibration and sustained touch sensors of the sensor portion are in electrical communication with the controller electronics 520 that use the signals to determine information relating to touch events, such as touch position, occurrence of lift-off events, and so forth. In system 500, sensor portion 510 is shown disposed over a display element 530, for example so that the display is viewable through the sensor portion. Display element 530 can be a changeable display such as a cathode ray tube, liquid crystal display, plasma display, electroluminescent display, and so forth. Display element 530 can also include static information or images, such as graphics, either alone or in combination with a changeable display.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A method for detecting the presence of a sustained touch on a vibration-sensing touch sensor comprising:
    determining position of a touch to a touch surface of a touch plate using vibrations, via a parameter represented by signals in a range of frequencies, propagating in the touch plate due to the touch;
    detecting at least one parameter indicative of sustained contact of the touch on the touch surface, the at least one parameter being different from the parameter of the vibrations used to determine the position of the touch;
    responsive to detecting the at least one parameter, generating a signal indicative of the sustained contact; and
    determining a removal of the touch from the touch surface responsive to a sufficient change in signal level of the signal wherein detecting the at least one parameter indicative of sustained contact includes at least one of detecting displacement of the touch plate, detecting flexing of the touch plate, and detecting low frequency rumble coupled in the touch plate.

2. The method of claim 1, further comprising monitoring for changes in the signal level of the signal indicative of the sustained contact at least from when the touch is first detected until removal of the touch is determined.

3. The method of claim 2, further comprising updating a baseline signal level for the signal indicative of the sustained contact when a change is detected.

4. The method of claim 1, wherein the sufficient change in the signal indicative of the sustained contact comprises a threshold percentage drop off in the signal level.

5. The method of claim, 1 wherein detecting a signal indicative of sustained contact of the touch comprises detecting displacement of the touch plate.

6. The method of claim 1, wherein detecting a signal indicative of sustained contact of the touch comprises detecting flexing of the touch plate.

7. The method of claim 1, wherein detecting the at least one parameter indicative of sustained contact of the touch comprises detecting low frequency rumble coupled into the touch plate due to the sustained contact.

8. The method of claim 1, wherein the removal of the touch is registered as a lift-off that triggers performance of a function in a system that uses the vibration-sensing touch sensor as an input device.

9. A touch input device capable of determining touch input information from signals generated in response to vibrations propagating in a touch plate due to the touch input on a touch surface of the touch plate, the device comprising:
    one or more sensors coupled to the touch plate and configured, in response to detecting at least one parameter indicative of sustained contact of the touch input on the touch surface, to generate signals indicative of the sustained contact while the touch input remains on the touch surface, the at least one parameter being derived from a source different from the vibrations, as represented by signals in a range of frequencies, used to determine position of the touch input on the touch surface; and
    electronics configured to receive the signals generated by the one or more sensors and to determine whether the touch input has been removed from the touch surface based on a change in signal level of the received signals wherein detecting the at least one parameter indicative of sustained contact includes at least one of detecting displacement of the touch plate, detecting flexing of the touch plate, and detecting low frequency rumble coupled in the touch plate.

10. The touch input device of claim 9, wherein the one or more sensors are configured to generate signals in response to displacement of the touch plate.

11. The touch input device of claim 10, wherein the one or more sensors comprise variable capacitor force sensors.

12. The touch input device of claim 9, wherein the one or more sensors are configured to generate signals in response to flexing of the touch plate.

13. The touch input device of claim 12, wherein the one or more sensors comprise piezoelectric transducers.

14. The touch input device of claim 9, wherein the at least one parameter is low frequency rumble coupled into the touch plate from the touch input.

15. The touch input device of claim 9, wherein the one or more sensors are configured to detect vibrations propagating in the touch plate due to the touch input and generate signals that can be used to determine touch position.

16. The touch input device of claim 9, further comprising one or more vibration sensing devices, separate from the one or more sensors, that are coupled to the touch plate and configured to detect vibrations propagating in the touch plate due to the touch input and generate signals that can be used to determine touch position, wherein the one or more sensors are not used to determine touch position.

17. The touch input device of claim 9, wherein the one or more sensors are configured to generate signals in response to at least one of displacement of the touch plate, flexing of the touch plate, and low frequency rumble coupled in to the touch plate from the touch input.

18. The method of claim 1, wherein the at least one parameter indicative of sustained contact is not used to determine the position of the touch to the touch surface of the touch plate.

19. The touch input device of claim 9, wherein the at least one parameter indicative of sustained contact is not indicative of the position of the touch input on the touch surface of the touch plate.

20. A method for detecting the presence of a sustained touch on a touch surface of a touch plate, the method comprising:
    using a vibration sensor coupled to the touch plate to detect vibrations propagating in the touch plate due to a touch input on the touch surface of the touch plate;
    determining a position of the touch input on the touch surface using the detected vibrations;
    using another sensor coupled to the touch plate to detect at least one parameter indicative of sustained contact of the touch input on the touch surface, the at least one parameter being different from the detected vibrations and the at least one parameter not being used to determine the position of the touch input on the touch surface;
    responsive to detecting the at least one parameter, generating a signal indicative of the sustained contact; and
    determining a removal of the touch input from the touch surface responsive to a sufficient change in signal level of the signal indicative of the sustained contact wherein detecting the at least one parameter indicative of sustained contact includes at least one of detecting displacement of the touch plate, detecting flexing of the touch plate, and detecting low frequency rumble coupled in the touch plate.

21. The method of claim 20, wherein the signal indicative of the sustained contact is not used to determine the position of the touch input on the touch surface, and wherein the other sensor is a plate displacement sensor that detects the at least one parameter indicative of sustained contact responsive to changes in capacitance of the plate displacement sensor.

22. The method of claim 20, wherein the other sensor is not used to determine the position of the touch input on the touch surface.

23. The method of claim 20, further comprising generating a signal indicative of the position of the touch input on the touch surface responsive to the detected vibrations and using the signal indicative of the position of the touch input on the touch surface to determine the position of the touch input on the touch surface.

24. The touch input device of claim 9, further comprising one or more vibration sensing devices that are coupled to the touch plate and configured to detect vibrations propagating in the touch plate due to the touch input and generate signals that can be used to determine touch position, wherein said one or more sensors include different sensing capabilities than the one or more vibration sensing devices.

25. A touch input device capable of determining touch input information from signals generated in response to vibrations propagating in a touch plate due to the touch input on a touch surface of the touch plate, the device comprising:
   one or more sensors coupled to the touch plate and configured, in response to detecting at least one parameter indicative of sustained contact of the touch input on the touch surface, to generate signals indicative of the sustained contact while the touch input remains on the touch surface, the at least one parameter being derived from a source different from the vibrations used to determine position of the touch input on the touch surface;
   electronics configured to receive the signals generated by the one or more sensors and to determine whether the touch input has been removed from the touch surface based on a change in signal level of the received signals; and
   one or more vibration sensing devices that are coupled to the touch plate and configured to detect vibrations propagating in the touch plate due to the touch input and generate signals that can be used to determine touch position, the one or more vibration sensing devices being sensitive to vibrations in a first frequency range and wherein said one or more sensors are rumble detectors being sensitive to vibrations in a second frequency range, the second frequency range including frequencies below 200 Hz, and the first frequency range including frequencies above 200 Hz.

26. The method of claim 1, wherein the vibrations used to determine the location of the touch are passive vibrations.

* * * * *